(12) United States Patent
Henss et al.

(10) Patent No.: US 8,631,653 B1
(45) Date of Patent: Jan. 21, 2014

(54) FUEL-LESS STEAM-DRIVEN ELECTRIC GENERATING SYSTEM

(76) Inventors: Nikolai Henss, Phoenix, AZ (US); Ferdinand Henss, Phoenix, AZ (US)

( * ) Notice: Subject to any disclaimer, the term of this patent is extended or adjusted under 35 U.S.C. 154(b) by 983 days.

(21) Appl. No.: 12/615,131

(22) Filed: Nov. 9, 2009

Related U.S. Application Data

(60) Provisional application No. 61/112,590, filed on Nov. 7, 2008.

(51) Int. Cl.
*F01K 23/06* (2006.01)
*F01K 23/04* (2006.01)
*H01M 10/50* (2006.01)
*H01M 8/00* (2006.01)

(52) U.S. Cl.
USPC ................ 60/670; 429/120; 429/400; 60/655

(58) Field of Classification Search
USPC .......... 60/641.1, 641.2, 641.9, 645–681, 698, 60/712; 165/45; 429/120, 400–535
See application file for complete search history.

(56) References Cited

U.S. PATENT DOCUMENTS

| | | | |
|---|---|---|---|
| 3,982,962 A | 9/1976 | Bloomfield | |
| 4,041,210 A | 8/1977 | Van Dine | |
| 4,117,682 A * | 10/1978 | Smith | 60/641.8 |
| 4,141,825 A * | 2/1979 | Conger | 210/638 |
| 4,376,435 A * | 3/1983 | Pittman | 126/563 |
| 4,644,751 A * | 2/1987 | Hsu | 60/676 |
| 4,722,873 A | 2/1988 | Matsumura | |
| 4,873,829 A * | 10/1989 | Williamson | 60/670 |
| 5,084,362 A | 1/1992 | Farooque | |
| 5,346,592 A * | 9/1994 | Madani | 202/176 |
| 5,449,568 A | 9/1995 | Micheli et al. | |
| 5,541,014 A | 7/1996 | Micheli et al. | |
| 5,554,453 A | 9/1996 | Steinfeld et al. | |
| 7,188,478 B2 * | 3/2007 | Bourgeois | 60/772 |
| 7,428,816 B2 * | 9/2008 | Singh et al. | 60/651 |
| 2003/0054214 A1 | 3/2003 | Noelscher | |
| 2004/0197612 A1 | 10/2004 | Keefer et al. | |
| 2006/0003207 A1 | 1/2006 | Balan et al. | |
| 2006/0042251 A1* | 3/2006 | Villalobos | 60/670 |
| 2007/0235583 A1* | 10/2007 | Palmer | 244/30 |

FOREIGN PATENT DOCUMENTS

JP 409139217 A 5/1997

OTHER PUBLICATIONS

Graham,Planning and engineering data, 1984, p. 11.*
Dally, Feasibility of Underground Cooling for Geothermal Power Cycles,2009,p. 2.*
Valenti, "Molten-carbonate fuel cells go Navy", http://www.allbusiness.com/professioani-scientific/scientific-research-development/648149-1.html, Mechanical Engineering-CIME, Dec. 1, 1997.

* cited by examiner

*Primary Examiner* — Kenneth Bomberg
*Assistant Examiner* — Christopher Jetton
(74) *Attorney, Agent, or Firm* — Schmeiser, Olsen & Watts LLP

(57) ABSTRACT

A system for generating electricity including a water storage tank coupled to a heat exchanger and an oxygen generator. The oxygen generator separates water into oxygen and hydrogen and flows each element to the heat exchanger. The heat exchanger includes a fuel cell and a tube that water flows through adjacent the fuel cell. The operation of the fuel cell results in a by product of heat. The heat from the fuel cell is then transferred to water flowing through the tube and the water is converted to steam. The steam drives a turbine generator to produce electricity. The fuel cell generates water in its processing that is returned to the water storage tank.

6 Claims, 5 Drawing Sheets

FUEL-LESS STEAM-DRIVEN ELECTRIC GENERATING SYSTEM

CROSS REFERENCE TO RELATED APPLICATION

This application claims priority to U.S. Provisional Patent Application to entitled "FUEL-LESS STEAM-DRIVEN ELECTRIC GENERATING SYSTEM," Ser. No. 61/112,590, filed Nov. 7, 2009, the disclosure of which is hereby incorporated entirely herein by reference.

BACKGROUND OF THE INVENTION

1. Field of the Invention

The present invention relates generally to the field of electricity generation and more specifically relates to steam driven electrical generators using a molten carbonate fuel cell.

2. Description of the Related Art

Problems exist when power is generated due to the inefficiencies created when converting kinetic energy into potential stored energy. Renewable and non-renewable natural resources such as petroleum products, coal, nuclear, wind, sunlight and others have been used to create storable electrical power that may be used to satisfy existing power requirements. Unfortunately, this has proven to be an inefficient process because much of the kinetic energy is lost to the environment due to the general inefficiencies of such systems. Other negative effects such as pollution and a depletion of readily available natural resources have created a need for an electrical generating system to be developed that leaves no environmental footprint.

Another problem of conventional electricity generating systems is realized when a portable system for electricity generation is required to supply power to a moving entity or for use in remote locations. Conventional electricity generating systems require also transporting a fuel source that is expended during operation of the electricity generating system. A need for a system that requires a minimum of resources to operate and that lessens the payload and/or the storage capacity is desirable to minimize costs and to maximize efficiency and use time and/or duration.

Yet another complication of conventional electricity generating systems can exist due to the unsafe nature of storing and disposing of certain kinetic energy sources and byproducts such as found when using nuclear energy. Nuclear energy, although efficient by nature, requires strict procedures and expensive equipment to safely contain the potentially deadly and environmentally dangerous materials. When such materials are disposed of, an enormous financial burden on the company or government is created in order to ensure that harm to individuals and the environment is avoided.

Ideally, a generating system should require the least possible maintenance and use a minimum of natural resources and, yet, would operate reliably and be manufactured at a modest expense. Accordingly, a need exists for a safe, reliable generating system to efficiently generate electricity and to avoid the above-mentioned problems.

SUMMARY OF THE INVENTION

The present invention holds significant improvements and serves as a zero emissions system with means to provide electricity generation without expending resources from fossil or nuclear fuel sources within a self-replenishing semi-closed loop process. The system includes a water storage tank coupled to a heat exchanger and an oxygen generator. The oxygen generator separates water into oxygen and hydrogen and each element is transferred to the heat exchanger. The heat exchanger includes a molten carbonate fuel cell and a tube that water flows through adjacent the fuel cell. The operation of the fuel cell results in a by product of heat. The heat from the fuel cell is then transferred to water flowing through the tube and the water is converted to steam. Steam drives a turbine generator to produce electricity. The fuel cell generates water in its processing that is returned to the water storage tank. The present invention may also be adapted to use reclaimed water or salt water to provide such electricity generation. A by-product of systems utilizing reclaimed or salt water is potable water.

An aspect of the present invention includes a fuel-less steam-driven electric generating system comprising a water source, a heat exchanger, and a turbine generator. Water from the water source is heated to steam in response to heat transferred from the heat exchanger to the water. A turbine of the turbine generator rotates in response to the flowing of steam through the turbine generator. Electricity is generated in response to rotation of the turbine of the turbine generator.

Another aspect of the present invention includes a fuel-less steam-driven electricity generating system comprising a water source wherein said water source comprises a reclaimed water; a filter adapted to remove particular impurities from said reclaimed water; an electrolysis unit to divide said water at the molecular level thereby releasing hydrogen and oxygen molecules; a hydrogen storage tank to store the hydrogen molecules; an oxygen storage tank to store the oxygen molecules; and a heat exchanger comprising a molten carbonate fuel cell and a tube configured to flow water from the water source through the tube adjacent the molten carbonate fuel cell, wherein the water is heated to steam in response to heat transferred from the molten carbonate fuel cell to the water. The system may also include a rotatable turbine generator wherein a turbine of the turbine generator rotates in response to steam flowing through the turbine generator. The turbine generator produces electricity in response to the rotation of the turbine. The system may also include a condenser to condense the steam at low pressure, wherein the water from the condenser is sterilized in response to the temperature of the molten carbonate fuel cell, thereby producing distilled water.

Yet another aspect of the present invention includes a method of generating electricity using a fuel-less steam-driven electric generator, the method comprising receiving water from a water source; heating said water using a heat exchanger comprising a molten carbonate fuel cell as a heat source; generating electricity using a turbine generator; wherein water from the water source is heated to steam by the heat exchanger and flowed through the turbine generator to rotate a turbine of the turbine generator, wherein electricity is generated in response to rotation of a turbine.

The foregoing and other features and advantages of the present invention will be apparent from the following more detailed description of the particular embodiments of the invention, as illustrated in the accompanying drawings.

BRIEF DESCRIPTION OF THE DRAWINGS

The preferred embodiments of the present invention will hereinafter be described in conjunction with the appended drawings, wherein like designations denote like elements, and:

FIG. 3 is a schematic view of an embodiment of an electric generating system for use with fresh, reclaimed water and the like.

DETAILED DESCRIPTION OF EMBODIMENTS OF THE INVENTION

As discussed above, embodiments of the present invention relate to a zero emissions system with means to provide electricity generation without expending resources from fossil or nuclear fuel sources within a self-replenishing semi-closed loop process. The system includes a water storage tank coupled to a heat exchanger and an oxygen generator. The oxygen generator separates water into oxygen and hydrogen and each element is transferred to the heat exchanger. The heat exchanger includes a molten carbonate fuel cell and a tube that water flows through adjacent the fuel cell. The operation of the fuel cell results in a byproduct of heat. The heat from the fuel cell is then transferred to water flowing through the tube and the water is converted to steam. Steam drives a turbine generator to produce electricity.

Figure 1:
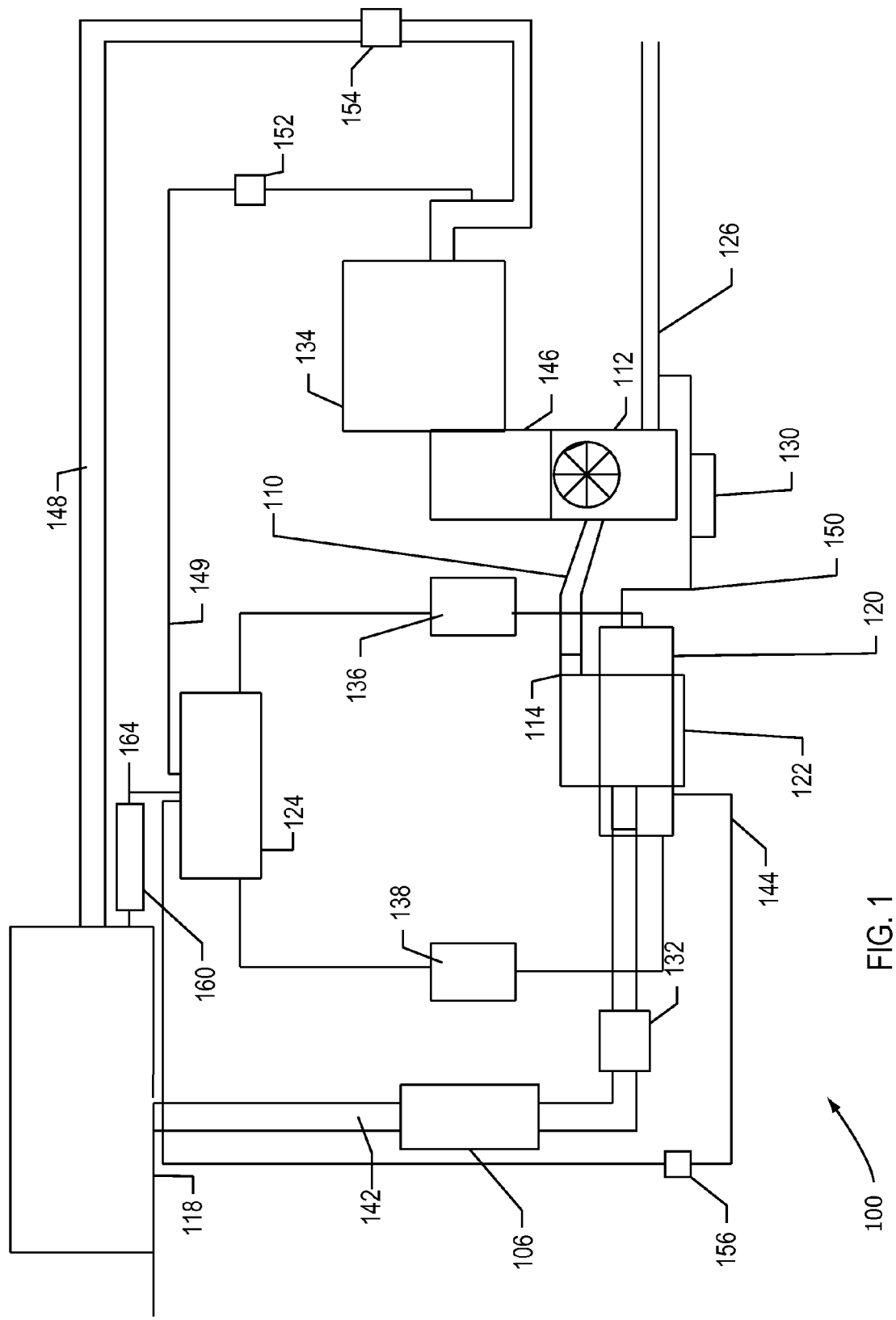
FIG. 1 is a schematic view of a first embodiment of an electric generating system, according the present invention.

Referring now to FIG. 1, particular embodiments of the present invention may include a steam-driven electricity generating system 100. Generating system 100 may comprises: a water storage tank 118; a heat exchanger 122; a oxygen generator 124; a molten carbonate fuel cell 120; a turbine generator 112; a condenser 134; a hydrogen storage tank 136; a oxygen storage tank 138; a low-pressure steam collector 146; a main water feed line 142; a water return line 144; a water pump 132; a steam control valve 114; an inverter 130; and a distilled water supply line 148.

Water preferably enters generating system 100 from at least one water source. The water source may include water storage tank 118. Water storage tank 118 preferably comprises a corrosion resistant material to suitably contain the water for an extended time period. Water storage tank 118 may store water at an ambient pressure or a higher-than-atmospheric-pressure, depending on application and relative location of water storage tank 118. Water storage tank 118 may be fluidly coupled to heat exchanger 122 and oxygen generator 124, as illustrated in FIG. 1. Preferably, water traveling through water feed line 142 is filtered by filter 106 before reaching water pump 132. Filter 106 comprises a device which removes impurities from water by means of a fine physical barrier, chemical process and/or biological process.

Oxygen generator 124 may molecularly separate water into oxygen and hydrogen elements. Water from the water tank 118 may travel through water supply line 164 and through filter 160 prior to entering the oxygen generator 124 in order to be separated. Oxygen is preferably temporarily contained in an oxygen storage tank 138 and hydrogen is preferably temporarily stored in a hydrogen storage tank 136. Preferably, each of oxygen storage tank 138 and hydrogen storage tank 136 comprise suitable material with properties sufficient in strength to substantially contain elements for an extended period of time. Next, oxygen and hydrogen elements are "flowed" to a molten carbonate fuel cell 120 of the heat exchanger 122.

Heat exchanger 122 may be employed to provide efficient heat transfer from one medium to another, whether the media are in direct or indirect contact. Heat exchanger 122 may be designed to maximize the surface area of the wall between the two mediums, yet minimizing resistance to fluid flow through heat exchanger 122. Heat exchanger 122 may be a counter-flow arrangement, as shown, or alternately preferably a parallel arrangement, depending on application.

Heat exchanger 122, according to particular embodiments of the present invention, may include a molten carbonate fuel cell 120 that permits water to flow from the water feed line 142 through the heat exchanger 122 adjacent to the molten carbonate fuel cell 120. The molten carbonate fuel cell 120 may comprise high-temperature fuel cells using an electrolyte substantially composed of a molten carbonate salt mixture essentially suspended in a porous, chemically inert ceramic matrix of beta-alumina solid electrolyte. Salt compound is preferably sodium carbonate within the preferred embodiment of the present invention. Alternately preferably, magnesium carbonate may be used as the electrolyte. The molten carbonate fuel cell 120 in operation combines the separated oxygen and hydrogen molecules together again to form water. This combination process generated electricity and further creates heat. Molten carbonate fuel cell 120 preferably operates at or above an elevated temperature of about 650° C. (approximately 1200° F.). Non-precious metals can be used as catalysts at the anode and cathode of molten carbonate fuel cell 120, thereby reducing costs.

Molten carbonate fuel cell 120 preferably provides improved efficiency over phosphoric acid fuel cells. Molten carbonate fuel cell 120 can reach efficiencies of about 60 percent, as compared to a range of about 37 to about 42 percent efficiency of a phosphoric acid fuel cell plant. When the waste heat is captured and used, overall fuel efficiencies can be as high as 85 percent in molten carbonate fuel cell 120.

Alternatives to molten carbonate fuel cell 120 such as alkaline, phosphoric acid, and polymer electrolyte membrane fuel cells require an external reformer to convert certain energy-dense fuels to hydrogen. Molten carbonate fuel cell 120 preferably operates at elevated temperatures converting fuels to hydrogen within the fuel cell itself by an internal reforming process, which also reduces cost making a preferred embodiment of the present invention more cost-effective in use. Further, molten carbonate fuel cell 120 is preferred since it is not as prone to carbon monoxide or carbon dioxide poisoning, especially when compared to systems using coal as a fossil fuel.

The operation of molten carbonate fuel cell 120 results in a by-product of a thermodynamic increase in energy, wherein the operating temperature is about 1,200 degrees F., well within the standard operating range of molten carbonate fuel cell 120. This heat from molten carbonate fuel cell 120 is then transferred to water flowing through heat exchanger 122 and water is converted to steam. In this manner molten carbonate fuel cell 120 may be used as a heat source. Steam drives turbine generator 112 to produce electricity 126. Molten carbonate fuel cell 120 preferably generates water in its processing that is returned to the water storage tank 118 via water return line 144, as shown.

As steam leaves heat exchanger 122 it passes through steam control valve 114, preferably located in high pressure steam output line 110, when open, and passes into turbine generator 112. Steam control valve 114 is preferably designed to operate to control amount of steam that enters turbine generator 112 to effectively manipulate production of electricity 126. Steam comprises an intense level of kinetic energy that is preferably used to turn turbine generator 112. Turbine generator 112 generates electricity 126 in AC form that is combined with AC electricity 126 derived from DC output from molten carbonate fuel cell 120, and transported by fuel cell electrical output line 150 to be converted by an inverter 130. In particular embodiments, the electricity generated by one of the molten carbonate fuel cell 120 and the turbine generator 112 may be utilized as a power source to operate the oxygen generator 124. It is noted that turbines and inverters as described herein, methods of using working fluids to provide energy by the use of turbines, and the use of inverters to convert DC to AC electrical power will be understood by those knowledgeable in such art.

Steam preferably collects in low-pressure steam collector 146 and is condensed into water preferably using a condenser 134. Condenser 134 comprises a heat-exchanging means which condenses steam in its gaseous state into its liquid state of water. The latent heat is given up by steam, and transfers to the coolant within condenser 134.

Once steam is condensed as liquid water, it no longer has any impurities thus, water is distilled and/or potable and travels through distilled water supply line 148 either to water storage tank 118, as shown and/or to an external storage location to be used as a fresh water source. This ability to provide environmentally-friendly distilled and/or potable water as a byproduct is an extreme advantage when generating system 100 is employed in a remote location such as used for hospitals, military facilities and others and/or when employed in a moving vehicle such as a submarine. Generating system 100 is also reasonably safe and efficient to operate, and provides benefits to its users because of its relative portability. Further, generating system 100 provides efficient power generation with a minimum input of resources and acts as a self-replenishing semi-closed loop process.

It will be understood that other water pumps 152, 154 and 156 may be employed to move water through the system 100.

Figure 2:
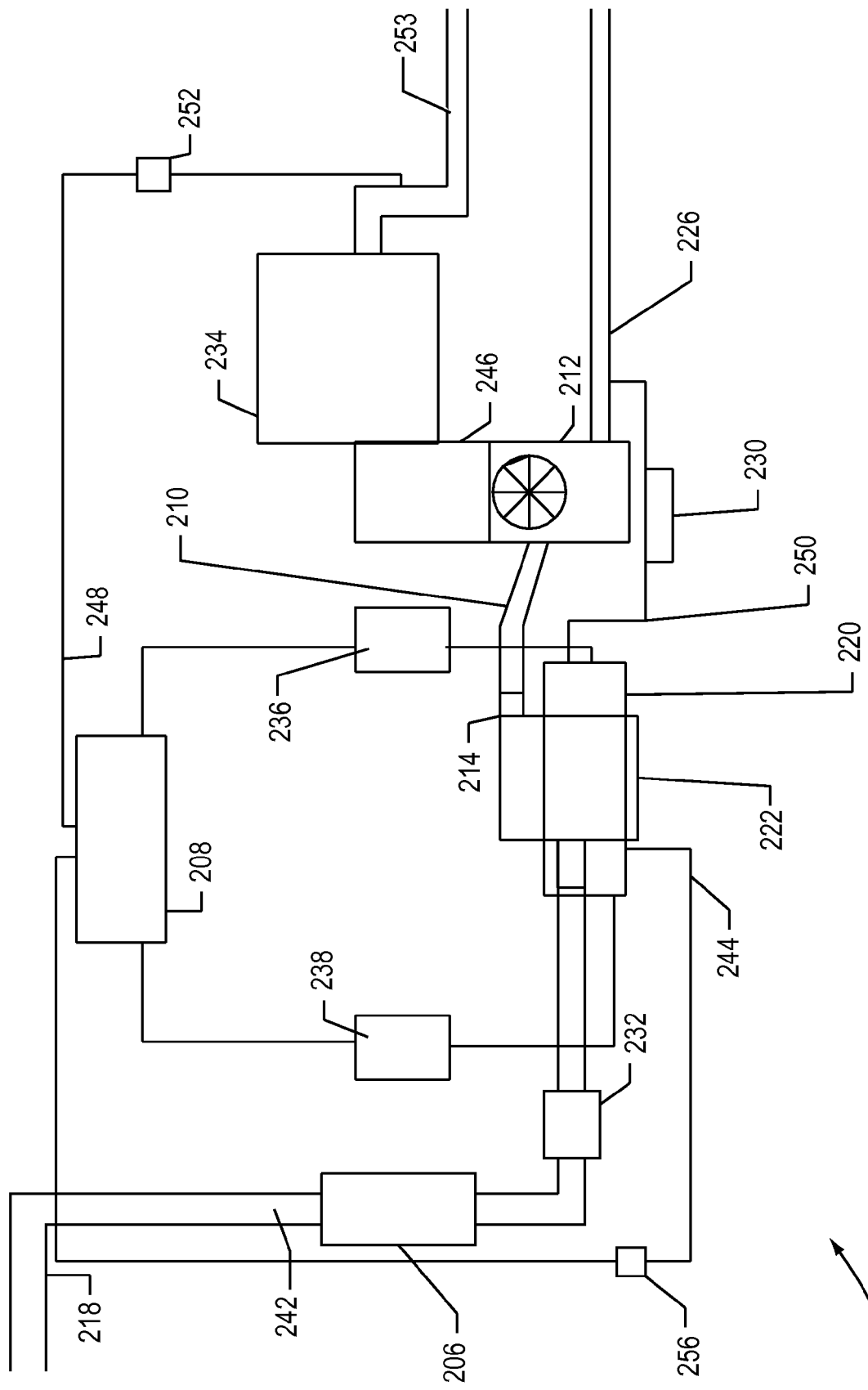
FIG. 2 is a schematic view of a second embodiment of an electric generating system, according the present invention.

Referring now to FIG. 2, other particular embodiments of the present invention may include a steam-driven electricity generating system 200. Generating system 200 may comprises: a water source 218; a heat exchanger 222; an electrolysis unit 208; a molten carbonate fuel cell 220; a turbine generator 212; a condenser 234; a low-pressure steam collector 246; a hydrogen storage tank 236; an oxygen storage tank 238; a main water feed line 242; a water return line 244; a water pump 232; a steam control valve 214; an inverter 230; and a distilled water supply line 248.

Water preferably enters generating system 200 from at least one water source 218. The water source 218 may be a reclaimed water source. Alternatively, the water source may be a freshwater source, and/or a saline seawater source or other type of water source. The water source 218 may be fluidly coupled to heat exchanger 222 and electrolysis unit 208. Generating system 200 provides a means of distilling therefore substantially any source of water is suitable for use. Preferably, water traveling through water feed line 242 is filtered by filter 206 before reaching water pump 232. Filter 206 comprises a device which removes impurities from water by means of a fine physical barrier, chemical process and/or biological process.

Electrolysis unit 208 may molecularly separate water into oxygen and hydrogen elements. Oxygen is preferably temporary contained in an oxygen storage tank 238 and hydrogen is preferably temporarily stored in a hydrogen storage tank 236. Preferably, each of oxygen storage tank 238 and hydrogen storage tank 236 comprise suitable material with properties sufficient in strength to substantially contain elements for an extended period of time. Next, oxygen and hydrogen elements are "flowed" to a molten carbonate fuel cell 220 of the heat exchanger 222.

It will be understood that electrolysis is a method used within the present invention to separate chemically bonded elements (hydrogen and oxygen) in compounds (water) by passing an electric current through them. Electrolysis unit 208 preferably comprises a power source connected to a plurality of electrodes or plates. More specifically, electrolysis unit 208 preferably comprises two electrodes, each further comprising an inert metal such as preferably, stainless steel or alternately preferably, platinum or other such suitable material. Stainless steel is preferably used, especially when dealing with large quantities of hydrogen since stainless steel will not substantially negatively react with the oxygen. Upon reading this specification, those with ordinary skill in the art will now appreciate that, under appropriate circumstances, considering such issues as design preference, user preferences, marketing preferences, cost, structural requirements, available materials, technological advances, etc., other electrode arrangements and materials such as, for example, iron, zinc, etc., may suffice.

Electrodes are preferably placed in the water. Hydrogen appears at the negatively charged electrode, the cathode, where the electrons are pumped into water. Oxygen appears at the positively charged electrode, namely the anode. Preferably, the hydrogen generated is substantially twice the amount of the oxygen generated. Both elements are proportional to the total electric charge sent through water. Methods of electrolysis will be understood by those knowledgeable in such art.

Heat exchanger 222 is preferably employed for an efficient heat transfer from one medium to another, whether the media are in direct or indirect contact. Heat exchanger 222 may be designed to maximize the surface area of the wall between the two mediums, yet minimizing resistance to fluid flow through heat exchanger 222. Heat exchanger 222 may preferably be a counter-flow arrangement, as shown, or alternately preferably a parallel arrangement, depending on application.

Heat exchanger 222 may include a molten carbonate fuel cell 220 that permits water to flow from the water feed line 242 through the heat exchanger 222 adjacent to molten carbonate fuel cell 220. The molten carbonate fuel cell 220 may comprise high-temperature fuel cells using an electrolyte substantially composed of a molten carbonate salt mixture essentially suspended in a porous, chemically inert ceramic matrix of beta-alumina solid electrolyte. Salt compound is preferably sodium carbonate within the preferred embodiment of the present invention. Alternately preferably, magnesium carbonate may be used as the electrolyte. The molten carbonate fuel cell 220 in operation combines the separated oxygen and hydrogen molecules together again to form water. This combination process generated electricity and further creates heat. Molten carbonate fuel cell 220 preferably operates at or above an elevated temperature of about 650° C. (approximately 1200° F.). Non-precious metals can be preferably used as catalysts at the anode and cathode of molten carbonate fuel cell 220, thereby reducing costs. Those with ordinary skill in the art will now appreciate that upon reading this specification and by their understanding the art of fuel cells as described herein, methods of use of fuel cells will be understood by those knowledgeable in such art.

Molten carbonate fuel cell 220 preferably provides improved efficiency over phosphoric acid fuel cells. Molten carbonate fuel cell 220 can reach efficiencies of about 60 percent, as compared to a range of about 37 to about 42 percent efficiency of a phosphoric acid fuel cell plant. When the waste heat is captured and used, overall fuel efficiencies can be as high as 85 percent in molten carbonate fuel cell 220.

Alternatives to molten carbonate fuel cell 220 such as alkaline, phosphoric acid, and polymer electrolyte membrane fuel cells require an external reformer to convert certain energy-dense fuels to hydrogen. Molten carbonate fuel cell 220 preferably operates at elevated temperatures converting fuels to hydrogen within the fuel cell itself by an internal reforming process, which also reduces cost making a preferred embodiment of the present invention more cost-effective in use. Further, molten carbonate fuel cell 220 are preferred since they are not as prone to carbon monoxide or carbon dioxide poisoning, especially when using coal as a fossil fuel. Upon reading this specification, those with ordinary skill in the art will now appreciate that, under appropriate circumstances, considering such issues as design preference, user preferences, marketing preferences, cost, structural requirements, available materials, technological advances, etc., other fuel cell alternatives and arrangements such as, for example, alkaline, phosphoric acid, and polymer electrolyte membrane fuel cells, etc., may suffice.

The operation of molten carbonate fuel cell 220 results in a by-product of a thermodynamic increase in energy, wherein the operating temperature is preferably about 1,200 degrees F., well within the standard operating range of molten carbonate fuel cell 220. This heat from molten carbonate fuel cell 220 is then transferred to water flowing through heat exchanger 222 and water is converted to steam. In this manner molten carbonate fuel cell 220 is preferably used as a heat source, within one of the most preferred embodiments of the present invention, as opposed to a power source. Steam preferably drives turbine generator 212 to produce electricity 226. Molten carbonate fuel cell 220 preferably generates water in its processing that is returned to the electrolysis unit 208 via water return line 244, as shown.

Steam preferably collects in low-pressure steam collector 246 and may be condensed into water using condenser 234. Condenser 234 comprises a heat-exchanging means which condenses steam in its gaseous state into its liquid state of water. The latent heat is given up by steam, and transfers to the coolant within condenser 234. Once steam is condensed as liquid water, it no longer has any impurities thus, water is distilled and/or potable. This is particularly significant since the water source 218 may be a reclaimed water source. Reclaimed water can only be used for irrigation purposes. However, particular embodiments of the present invention may utilize reclaimed water to generate electricity. During this process, the reclaimed water is filtered and then heated to a temperature above 1200 F, which results in sanitizing the steam. When the steam is condensed in the condenser 234, the reclaimed water is now potable and distilled. The distilled water may then be directed through distilled water supply line 248 to the electrolysis unit 208. The distilled water may also be directed through distilled water output 253 for external use. Particular embodiments will direct the distilled water through both the distilled water supply line 248 and the distilled water output 253. This ability to provide environmentally-friendly distilled and/or potable water as a byproduct is an extreme advantage when generating system 200 is employed in a remote location such as used for hospitals, military facilities and others and/or when employed in a moving vehicle such as a submarine. Generating system 200 is also reasonably safe and efficient to operate, and provides benefits to its users because of its relative portability. Further, generating system 200 provides efficient power generation with a minimum input of resources and acts as a self-replenishing semi-closed loop process.

As steam leaves heat exchanger 222 it passes through steam control valve 214, preferably located in high pressure steam output line 210, when open, and passes into turbine generator 212. Steam control valve 214 is preferably designed to operate to control amount of steam that enters turbine generator 212 to effectively manipulate production of electricity 226.

Steam comprises an intense level of kinetic energy that is preferably used to turn a turbine of the turbine generator 212. Turbine generator 212 generates electricity 226 in AC form that is combined with AC electricity 226 derived from DC output from molten carbonate fuel cell 220, and transported by fuel cell electrical output line 250 to be converted to AC electricity by an inverter 230. The turbine generator 212 generates the electricity in response to the rotation of the turbine of the turbine generator 212. In particular embodiments, the electricity generated by one of the molten carbonate fuel cell 220 and the turbine generator 212 may be utilized as a power source to operate the electrolysis unit 208.

It will be understood that other water pumps 252, and 256 may be employed to move water through the system 200

It will be understood that steam-drive electricity generating system 200 may be utilized in various applications, such as a power plant, to subsidize commercial and residential electricity demands, land vehicle power demands and further marine craft power demands. Further still, the system 200 may include a water source that is salt water, such as seawater. When used in this type of configuration the system 200 may further require a brine pump coupled to the heat exchanger 222, wherein the brine that is left after the water is converted to steam is pumped away from the heat exchanger. The brine may be utilized for external uses. This system 200 configured for use with salt water also has a byproduct of distilled water as described above. This is of particular benefit on marine craft and on locations adjacent seawater, wherein the water source is substantial and the distilled water may be used for any number of external uses. Further, the marine craft will have the ability to utilize less fuel and allow the marine craft to travel further on a single filling of fuel tanks.

Figure 3:
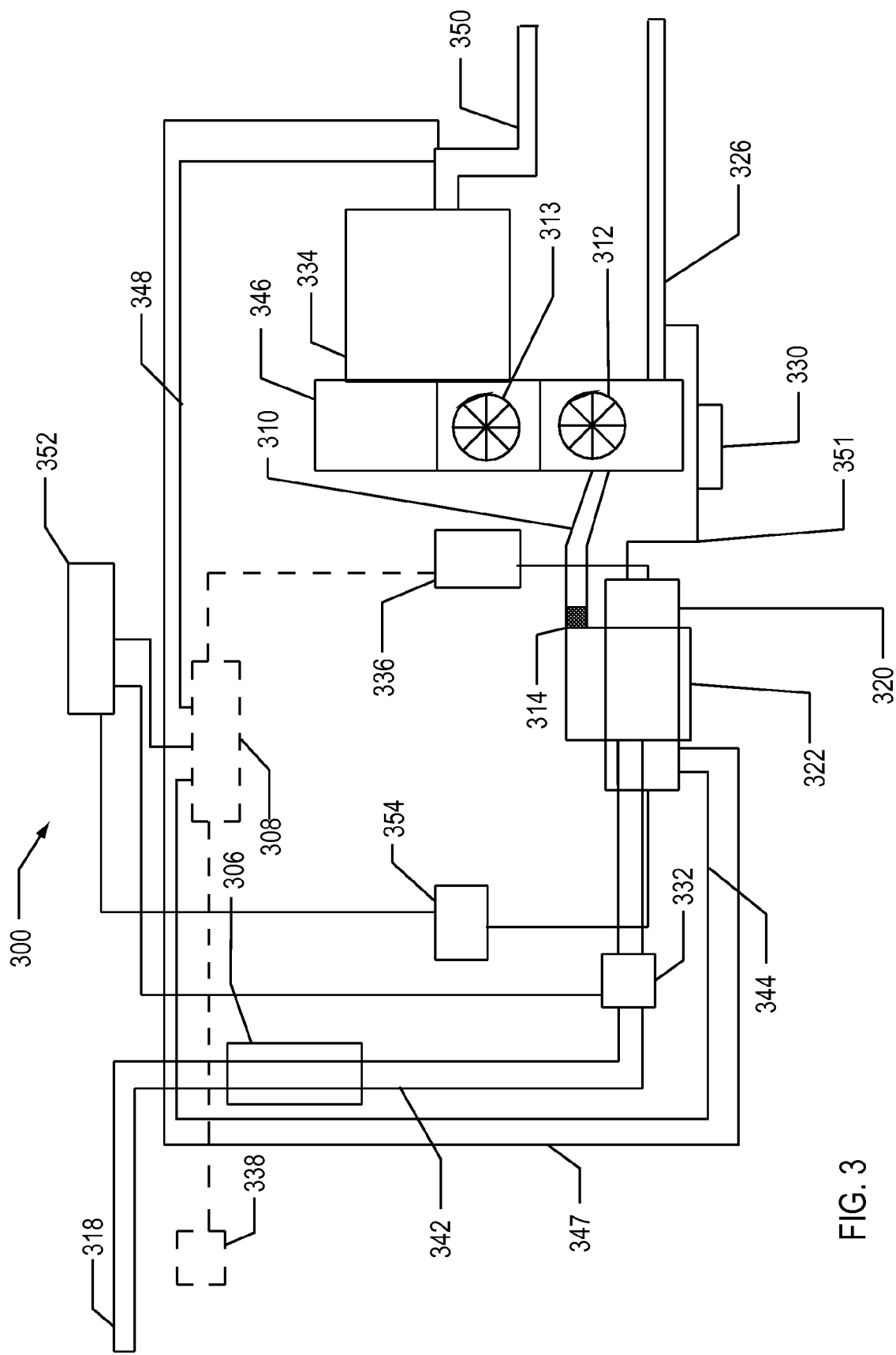

Referring now to FIG. 3, particular embodiments of the present invention may include a steam-driven electricity generating system 300. Generating system 300 may comprises: a water source 318; a heat exchanger 322; a electrolysis unit 308; a fuel cell 320; a high pressure turbine generator 312; a low pressure turbine generator 313; a condenser 334; a gas source 336; a oxygen storage tank 338; an air compressor 354; a low-pressure steam collector 346; a main water feed line 342; a water return line 344; a water pump 332; a steam control valve 314; an inverter 330; and a distilled water supply line 348; electrolysis unit or hydrogen generator power source 352.

Water preferably enters generating system 300 from at least one water source 318. The water source may include a reclaimed water source 318. Water source 318 is fluidly coupled to heat exchanger 322 and electrolysis unit 308, as illustrated in FIG. 3. Preferably, water traveling through water feed line 342 is filtered by filter 306 before reaching water pump 332. Filter 306 comprises a device which removes impurities from water by means of a fine physical barrier, chemical process and/or biological process.

A gas from the gas source 336 is "flowed" to a fuel cell 320 of the heat exchanger 322. Additionally, air compressor 354 flows air into the fuel cell 320. The gas from the gas source 336 interacts with an electrolyte in the fuel cell 320. The fuel cell 320 may be a molten carbonate or solid oxide fuel cell. In these embodiments, water produced by the fuel cell 320 may be transferred through line 347 to the external water storage location 350.

In particular embodiments, the gas source 336 is a hydrogen storage tank. An electrolysis unit 308 may molecularly separate water into oxygen and hydrogen elements. Oxygen is temporarily contained in an oxygen storage tank 338 and hydrogen is preferably temporarily stored in a hydrogen storage tank 336. Preferably, each of oxygen storage tank 338 and hydrogen storage tank 336 comprise suitable material with properties sufficient in strength to substantially contain elements for an extended period of time. Next, hydrogen elements are "flowed" to a molten carbonate or solid oxide fuel cell 320 of the heat exchanger 322. Additionally, air compressor flows air into the fuel cell 320. The oxygen stored in oxygen storage tank 338 may be utilized for other uses of oxygen, including medical uses, among others.

It will be understood that other types of gas from the gas source 336 may be utilized by the fuel cell 320. For example, and without limitation, the gas may be natural gas. When natural gas is the fuel, methane (the main ingredient of natural gas) and steam are converted into a hydrogen-rich gas inside the fuel cell stack (a process called "internal reforming"). Other gases may be utilized and the fuel cell may be modified by providing a proper electrolyte to interact with the gas.

Heat exchanger 322 may be employed to provide efficient heat transfer from one medium to another, whether the media are in direct or indirect contact. Heat exchanger 322 may be designed to maximize the surface area of the wall between the two mediums, yet minimizing resistance to fluid flow through heat exchanger 322. Heat exchanger 322 may be a counter-flow arrangement, as shown, or alternately preferably a parallel arrangement, depending on application.

Heat exchanger 322, according to particular embodiments of the present invention, may include a fuel cell 320, such as a molten carbonate or solid oxide fuel cell that permits water to flow from the water feed line 342 through the heat exchanger 322 adjacent to the fuel cell 320. The fuel cell 320 may comprise high-temperature fuel cells using an electrolyte substantially composed of a molten carbonate or solid oxide salt mixture essentially suspended in a porous, chemically inert ceramic matrix of beta-alumina solid electrolyte. Salt compound is preferably sodium carbonate within the preferred embodiment of the present invention. Alternately, magnesium carbonate may be used as the electrolyte. The molten carbonate or solid oxide fuel cell 320 in operation combines the separated oxygen and hydrogen molecules together again to form water. This combination process generates electricity and further creates heat. Molten carbonate or solid oxide fuel cell 320 preferably operates at or above an elevated temperature of about 650° C. (approximately 1200° F.). Non-precious metals can be used as catalysts at the anode and cathode of molten carbonate or solid oxide fuel cell 320, thereby reducing costs.

Molten carbonate or solid oxide fuel cell 320 preferably provides improved efficiency over phosphoric acid fuel cells. Molten carbonate or solid oxide fuel cell 320 can reach efficiencies of about 60 percent, as compared to a range of about 37 to about 42 percent efficiency of a phosphoric acid fuel cell plant. When the waste heat is captured and used, overall fuel efficiencies can be as high as 85 percent in molten carbonate or solid oxide fuel cell 320.

Alternatives to molten carbonate or solid oxide fuel cell 320 such as alkaline, phosphoric acid, and polymer electrolyte membrane fuel cells require an external reformer to convert certain energy-dense fuels to hydrogen. Molten carbonate or solid oxide fuel cell 320 preferably operates at elevated temperatures converting fuels to hydrogen within the fuel cell itself by an internal reforming process, which also reduces cost making a preferred embodiment of the present invention more cost-effective in use. Further, molten carbonate or solid oxide fuel cell 320 is preferred since it is not as prone to carbon monoxide or carbon dioxide poisoning, especially when compared to systems using coal as a fossil fuel.

The operation of molten carbonate or solid oxide fuel cell 320 results in a by-product of a thermodynamic increase in energy, wherein the operating temperature is about 1,200 degrees F., well within the standard operating range of molten carbonate or solid oxide fuel cell 320. This heat from molten carbonate or solid oxide fuel cell 320 is then transferred to water flowing through heat exchanger 322 and water is converted to steam. In this manner molten carbonate or solid oxide fuel cell 320 may be used as a heat source. Steam drives turbine generator 312 to produce electricity 326. Molten carbonate or solid oxide fuel cell 320 preferably generates water in its processing that is returned to the electrolysis unit 308 via water return line 344, as shown.

As steam leaves heat exchanger 322 it passes through steam control valve 314, preferably located in high pressure steam output line 310, when open, and passes into high pressure turbine generator 312. Steam control valve 314 is preferably designed to operate to control amount of steam that enters high pressure turbine generator 312 to effectively manipulate production of electricity 326. As the steam passes through the high pressure steam turbine generator 312, the steam, now at a low pressure, passes through a low pressure steam turbine generator 313. Steam comprises an intense level of kinetic energy that is preferably used to turn high pressure turbine generator 312 and low pressure turbine generator 313. Turbine generator 312 generates electricity 326 in AC form that is combined with AC electricity 326 derived from DC output from molten carbonate or solid oxide fuel cell 320, and transported by fuel cell electrical output line 351 to be converted by an inverter 330. In particular embodiments, the electricity generated by one of the molten carbonate or solid oxide fuel cell 320 and the turbine generators 312 and 313 may be utilized as a power source to operate the electrolysis unit 308. It is noted that turbines and inverters as described herein, methods of using working fluids to provide energy by the use of turbines, and the use of inverters to convert DC to AC electrical power will be understood by those knowledgeable in such art.

Steam preferably collects in low-pressure steam collector 346 and is condensed into water preferably using a condenser 334. Condenser 334 comprises a heat-exchanging means which condenses steam in its gaseous state into its liquid state of water. The latent heat is given up by steam, and transfers to the coolant within condenser 334.

Once steam is condensed as liquid water, it no longer has any impurities thus, water is distilled and/or potable and travels through distilled water supply line 348 either to electrolysis unit 308 and/or to an external storage location 350 to be used as a fresh water source. This ability to provide environmentally-friendly distilled and/or potable water as a byproduct is an extreme advantage when generating system 300 is employed in a remote location such as used for hospitals, military facilities and others and/or when employed in a moving vehicle such as a submarine. Generating system 300 is also reasonably safe and efficient to operate, and provides benefits to its users because of its relative portability. Further, generating system 300 provides efficient power generation with a minimum input of resources and acts as a self-replenishing semi-closed loop process.

It will be understood that during the initial starting of the power generating system 300, an external power source 352 may be needed to supply and initial amount of power to the electrolysis unit 308, as well as the pumps and compressors used in the system 300. Once the system is running and the fuel cell 320 is generating enough power that can be routed to the electrolysis unit, the external power source 352 may then be deactivated.

It will be understood that the steam-driven electricity system 300 may be utilized in various ways. For example, the steam-driven electricity generating system 300 may be utilized with a water treatment plant. In such an embodiment, the water treatment plant may utilize one or more systems 300, wherein the water treatment plant may operate the system 300 in order to offset electric costs and also provide potable water. The use by a water treatment plant can serve to generate electricity as well as recycling reclaimed water for uses as potable or distilled water. This system may also be employed in areas where water is not purified or drinkable in order to produce water for villages and people that was not before readily available.

Figure 4:
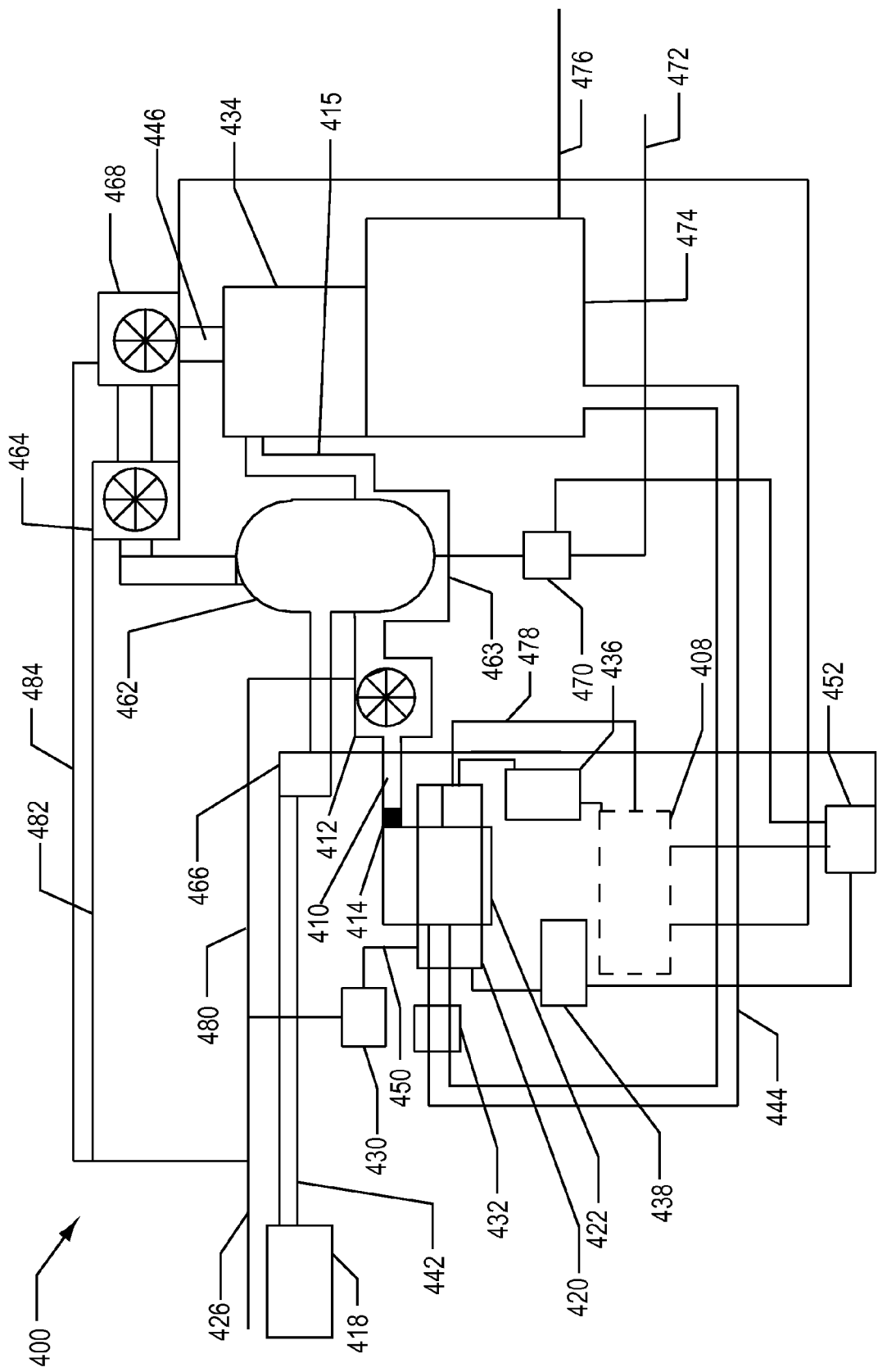
FIG. 4 is a schematic view of an embodiment of an electric generating system for use with salt water.

Referring now to FIG. 4, other particular embodiments of the present invention may include a steam-driven electricity generating system 400 for use in salt water applications or with a salt water source. Generating system 400 may comprises: a water source 418; a heat exchanger 422; an electrolysis unit 408; a fuel cell 420; a turbine generator 412; a condenser 434; a gas source 436; an oxygen storage tank 438; a main water feed line 442; a water return line 444; a water pump 432; a steam control valve 414; an inverter 430; and a distilled water supply line 448. The system 400 may further include a sea water pump 466, an evaporator vessel 462, a boiler 463, a secondary high pressure turbine generator 464, a low pressure steam turbine generator 468, and a brine pump 470.

Water preferably enters generating system 400 from at least one water source 418. The water source 418 may be a salt water source. The water source 418 may be fluidly coupled to evaporator vessel 462. Generating system 400 provides a means of distilling therefore substantially any source of water is suitable for use. Preferably, water traveling through water feed line 442 is moved in response to activation of the sea water pump 466.

The salt water is heated by boiler 463 in the evaporator vessel 462, wherein the boiler 463 is heated from excess heat from the high pressure turbine generator 412, wherein the steam from the high pressure turbine 412 passes through the boiler 463 to supply the heat and then flows into the condenser 434 through output line 415. The boiler evaporates the salt water and converts the water into steam and leaves a brine mixture within the evaporator vessel 462. The brine has many commercial applications especially in the manufacturing pharmaceuticals, detergents, deodorants, disinfectants, herbicides, pesticides, and plastics even consumer salt for consumption or process' like water softening. The brine could be pumped and stored then shipped to manufacturers. In order to assist in pumping the brine from the evaporator vessel 462, a brine pump 470 may be employed and the system 400 may flow water through a small inlet line to assist in the pumping of the brine out.

The steam generated from the evaporator vessel 462 is flowed to the secondary high pressure turbine generator 464. The low pressure steam exiting the secondary high pressure turbine is flowed through the low pressure steam turbine generator 468. Water is desalinated prior to being used in the heat exchanger 422. This reduces the "contamination" of the system. Once desalinated the water can be used as potable water. This desalinization occurs during the evaporative portion. The steam, upon exiting the low pressure steam turbine generator 468 is condensed in condenser 434 and then stored in a distilled storage tank 474. Water from the distilled water storage tank 474 flows through distilled water supply 444 in response to activation of pump 432.

A gas from the gas source 436 is "flowed" to a fuel cell 420 of the heat exchanger 422. Additionally, an air compressor (not shown) flows air from oxygen storage tank 438 into the fuel cell 420. The gas from the gas source 436 interacts with an electrolyte in the fuel cell 420. The fuel cell 420 may be a molten carbonate or solid oxide fuel cell.

In particular embodiments, the gas source 436 is a hydrogen storage tank 436. In this embodiment, an electrolysis unit 408 may molecularly separate water into oxygen and hydrogen elements. Hydrogen is temporarily stored in a hydrogen storage tank 436. The hydrogen storage tank 436 comprises suitable material with properties sufficient in strength to substantially contain elements for an extended period of time. Next, hydrogen elements are "flowed" to a molten carbonate or solid oxide fuel cell 420 of the heat exchanger 422. Additionally, an air compressor 438 flows air into the fuel cell 420.

It will be understood that electrolysis is a method used within the present invention to separate chemically bonded elements (hydrogen and oxygen) in compounds (water) by passing an electric current through them. Electrolysis unit 408 preferably comprises a power source connected to a plurality of electrodes or plates. More specifically, electrolysis unit 408 preferably comprises two electrodes, each further comprising an inert metal such as preferably, stainless steel or alternately preferably, platinum or other such suitable material. Stainless steel is preferably used, especially when dealing with large quantities of hydrogen since stainless steel will not substantially negatively react with the oxygen. Upon reading this specification, those with ordinary skill in the art will now appreciate that, under appropriate circumstances, considering such issues as design preference, user preferences, marketing preferences, cost, structural requirements, available materials, technological advances, etc., other electrode arrangements and materials such as, for example, iron, zinc, etc., may suffice.

Electrodes are preferably placed in the water. Hydrogen appears at the negatively charged electrode, the cathode, where the electrons are pumped into water. Oxygen appears at the positively charged electrode, namely the anode. Preferably, the hydrogen generated is substantially twice the amount of the oxygen generated. Both elements are proportional to the total electric charge sent through water. Methods of electrolysis will be understood by those knowledgeable in such art.

It will be understood that other types of gas from the gas source 436 may be utilized by the fuel cell 420. For example, and without limitation, the gas may be natural gas. When natural gas is the fuel, methane (the main ingredient of natural gas) and steam are converted into a hydrogen-rich gas inside the fuel cell stack (a process called "internal reforming"). Other gases may be utilized and the fuel cell may be modified by providing a proper electrolyte to interact with the gas.

Heat exchanger 422 is preferably employed for an efficient heat transfer from one medium to another, whether the media are in direct or indirect contact. Heat exchanger 422 may be designed to maximize the surface area of the wall between the two mediums, yet minimizing resistance to fluid flow through heat exchanger 422. Heat exchanger 422 may preferably be a counter-flow arrangement, as shown, or alternately preferably a parallel arrangement, depending on application.

Heat exchanger 422 may include a molten carbonate or solid oxide fuel cell 420 that permits water to flow from the water feed line 444 through the heat exchanger 422 adjacent to molten carbonate or solid oxide fuel cell 420. The molten carbonate fuel cell 420 may comprise high-temperature fuel cells using an electrolyte substantially composed of a molten carbonate salt mixture essentially suspended in a porous, chemically inert ceramic matrix of beta-alumina solid electrolyte. Salt compound is preferably sodium carbonate within the preferred embodiment of the present invention. Alternately preferably, magnesium carbonate may be used as the electrolyte. The molten carbonate or solid oxide fuel cell 420 in operation combines the separated oxygen and hydrogen molecules together again to form water. This combination process generated electricity and further creates heat. Molten carbonate or solid oxide fuel cells 420 operate at or above an elevated temperature of about 650° C. (approximately 1200° F.). Non-precious metals can be preferably used as catalysts at the anode and cathode of molten carbonate fuel cell 420, thereby reducing costs. Those with ordinary skill in the art will now appreciate that upon reading this specification and by their understanding the art of fuel cells as described herein, methods of use of fuel cells will be understood by those knowledgeable in such art.

The fuel cell 420 may be a molten carbonate fuel cell and provides improved efficiency over phosphoric acid fuel cells. Molten carbonate fuel cell 420 can reach efficiencies of about 60 percent, as compared to a range of about 37 to about 42 percent efficiency of a phosphoric acid fuel cell plant. When the waste heat is captured and used, overall fuel efficiencies can be as high as 85 percent in molten carbonate 420.

In other embodiments, the fuel cell 420 may be a solid oxide fuel cell. The solid oxide fuel cell is an electrochemical conversion device that produces electricity directly from oxidizing a fuel. Fuel cells are characterized by their electrolyte material and, as the name implies, the solid oxide fuel cell has a solid oxide, or ceramic, electrolyte. Advantages of this class of fuel cells include high efficiencies, long term stability, fuel flexibility, low emissions, and cost. The largest disadvantage is longer start up times and mechanical/chemical compatibility issues.

Solid oxide fuel cells are a class of fuel cell characterized by the use of a solid oxide material as the electrolyte. In contrast to proton exchange membrane fuel cells, which conduct positive hydrogen ions (protons) through a polymer electrolyte from the anode to the cathode, the solid oxide fuel cells use the solid oxide electrolyte to conduct negative oxygen ions from the cathode to the anode. The electrochemical oxidation of the oxygen ions with hydrogen or carbon monoxide thus occurs on the anode side. Solid oxide fuel cell 420 can reach efficiencies of about 60 percent Alternatives to molten carbonate or solid oxide fuel cell 420 such as alkaline, phosphoric acid, and polymer electrolyte membrane fuel cells require an external reformer to convert certain energy-dense fuels to hydrogen. Molten carbonate or solid oxide fuel cell 420 preferably operates at elevated temperatures converting fuels to hydrogen within the fuel cell itself by an internal reforming process, which also reduces cost making a preferred embodiment of the present invention more cost-effective in use. Further, molten carbonate or solid oxide fuel cells 420 are preferred since they are not as prone to carbon monoxide or carbon dioxide poisoning, especially when using coal as a fossil fuel. Upon reading this specification, those with ordinary skill in the art will now appreciate that, under appropriate circumstances, considering such issues as design preference, user preferences, marketing preferences, cost, structural requirements, available materials, technological advances, etc., other fuel cell alternatives and arrangements such as, for example, alkaline, phosphoric acid, and polymer electrolyte membrane fuel cells, etc., may suffice.

The operation of molten carbonate or solid oxide fuel cell 420 results in a by-product of a thermodynamic increase in energy, wherein the operating temperature is preferably about 1,200 degrees F., well within the standard operating range of molten carbonate or solid oxide fuel cell 420. This heat from molten carbonate or solid oxide fuel cell 420 is then transferred to water flowing through heat exchanger 422 and water is converted to steam. In this manner molten carbonate or solid oxide fuel cell 420 is preferably used as a heat source, within one of the most preferred embodiments of the present invention, as opposed to a power source. Steam preferably drives high pressure steam turbine generator 412 to produce electricity 480. Molten carbonate or solid oxide fuel cell 420 preferably generates water in its processing that is returned to the electrolysis unit 408 via water return line 444, as shown.

Steam preferably collects in low-pressure steam collector 446 and may be condensed into water using condenser 434. Condenser 434 comprises a heat-exchanging means which condenses steam in its gaseous state into its liquid state of water. The latent heat is given up by steam, and transfers to the coolant within condenser 434. Once steam is condensed as liquid water, it no longer has any impurities thus, water is distilled and/or potable. This is particularly significant since the water source 418 may be a salt water source. The distilled water may then be directed through distilled water supply line 444 to the electrolysis unit 408. The distilled water may also be directed through distilled water output 476 for external use. Particular embodiments will direct the distilled water through both the distilled water supply line 444 and the distilled water output 476. This ability to provide environmentally-friendly distilled and/or potable water as a byproduct is an extreme advantage when generating system 400 is employed in a remote location such as used for hospitals, military facilities and others and/or when employed in a moving vehicle such as a submarine. Generating system 400 is also reasonably safe and efficient to operate, and provides benefits to its users because of its relative portability. Further, generating system 400 provides efficient power generation with a minimum input of resources and acts as a self-replenishing semi-closed loop process.

As steam leaves heat exchanger 422 it passes through steam control valve 414, preferably located in high pressure steam output line 410, when open, and passes into turbine generator 412. Steam control valve 414 is preferably designed to operate to control amount of steam that enters turbine generator 412 to effectively manipulate production of electricity 426.

Steam comprises an intense level of kinetic energy that is preferably used to turn a turbine of the turbine generator 412. Turbine generator 412 generates electricity 480 in AC form that is combined with AC electricity derived from DC output from molten carbonate or solid oxide fuel cell 420, which is transported by fuel cell electrical output line 450 to be converted to AC electricity by an inverter 430. The turbine generator 412 generates the electricity in response to the rotation of the turbine of the turbine generator 412. Further, the electricity generated by the turbine generator 412 and the fuel cell 420 may be combined with electricity 482 generated by the high pressure steam turbine generator 464 and the electricity 484 generated by the low pressure steam turbine generator 468. This combined electricity may be transferred for external uses along line 426. In particular embodiments, the electricity generated by one of the fuel cell 420 and the turbine generator 412 may be utilized as a power source to operate the electrolysis unit 408, as well as any pumps and compressors of the system.

It will be understood that steam-drive electricity generating system 400 may be utilized in various applications, such as a power plant, to subsidize commercial and residential electricity demands, land vehicle power demands and further marine craft power demands. Further still, the system 400 may include a water source that is salt water, such as seawater. When used in this type of configuration the system 400 may further require a brine pump coupled to the heat exchanger 422, wherein the brine that is left after the water is converted to steam is pumped away from the heat exchanger. This system 400 configured for use with salt water also has a byproduct of distilled water as described above. This is of particular benefit on marine craft and on locations adjacent seawater, wherein the water source is substantial and the distilled water may be used for any number of external uses. Further, the marine craft will have the ability to utilize less fuel and allow the marine craft to travel further on a single filling of fuel tanks.

It will be understood that during the initial starting of the power generating system 400, an external power source 452 may be needed to supply and initial amount of power to the electrolysis unit 408. Once the system is running and the fuel cell 420 is generating enough power that can be routed to the electrolysis unit 408 through electrical line 478, the external power source 452 may then be deactivated.

It will also be understood that according to particular embodiments, the system 400 includes a salt water portion and fresh water portion. The salt water portion includes the sea water pump 466, an evaporator vessel 462, a boiler 463, a secondary high pressure turbine generator 464 and a low pressure steam turbine generator 468. The fresh water portion includes those discussed above, namely a gas source 436, a heat exchanger 422 with a fuel cell 420, and a steam turbine generator 412.

It will be understood that the steam-driven electricity system 400 may be utilized in various ways. For example, the steam-driven electricity generating system 400 may be utilized with a marine vessel, such as a ship, a tanker, a submarine, an aircraft carrier and the like. Also, this may be used in a power plant off of the coast of a salt water body of water such as an ocean. In such an embodiment, one or more systems 400, wherein the water treatment plant may operate the system 400 in order to offset electric costs and also provide potable water. The use by a marine vessel or off an ocean coast can serve to generate electricity as well as desalinating salt water for uses as potable or distilled water.

It will further be understood that various steam-driven electricity generating systems may be utilized to offset power generation by conventional power generating devices, such as coal burning power plants, diesel engines, combustion engines, nuclear plants and any other type of power generating system or equipment.

Figure 5:
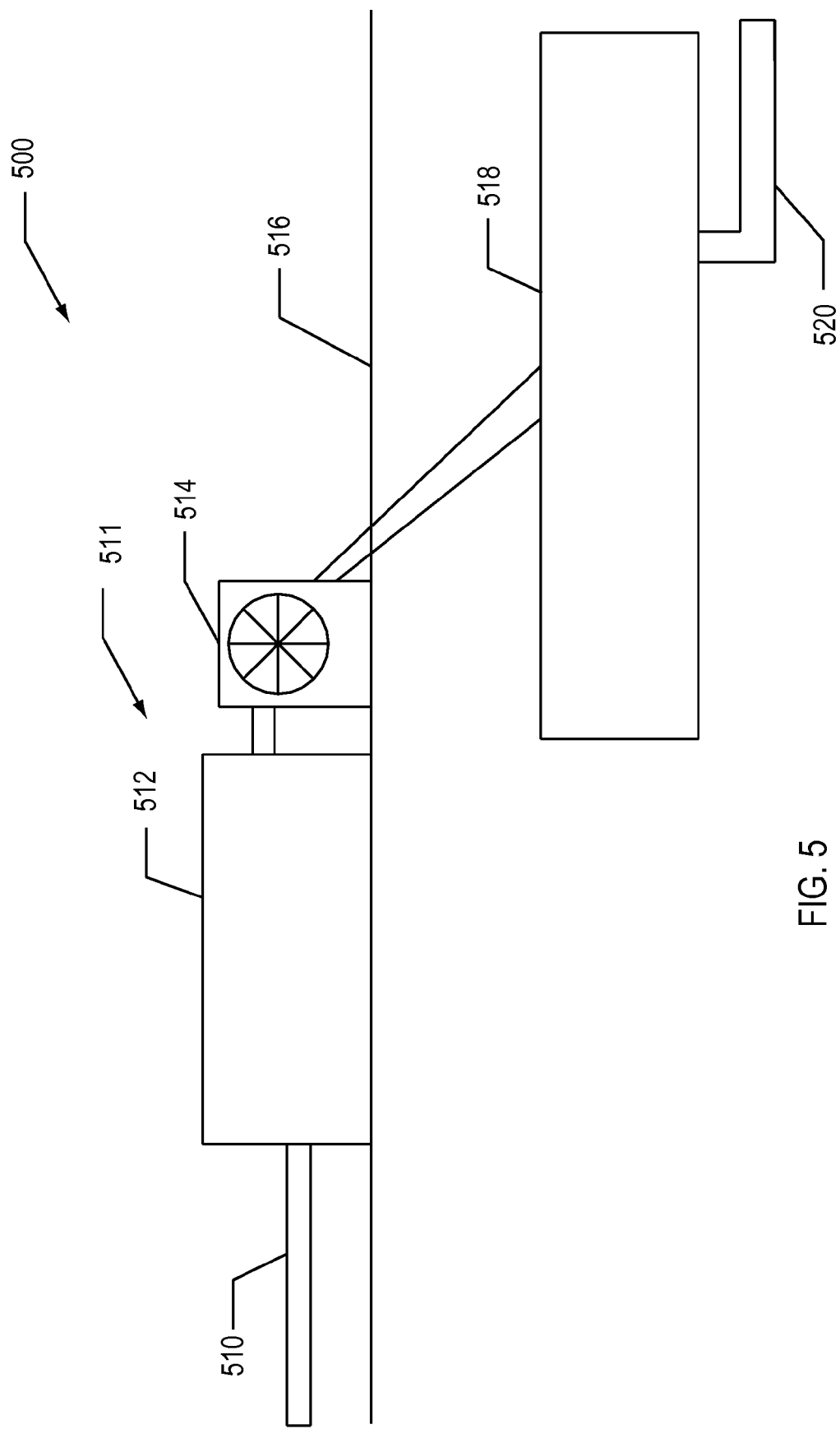
FIG. 5 is a schematic view of an embodiment of the steam-driven electricity generating system used in a power plant.

Referring again to the drawings, FIG. 5 depicts a power plant 500 in accordance with particular embodiments of the present invention. The power plant 500 includes at least one steam-driven electricity generating system 511 comprising a water source 510, a gas source and heat exchanger depicted as portion 512, the heat exchanger having a fuel cell with an electrolyte, wherein the fuel cell produces heat in response to combining gas from the gas source with the electrolyte. The system further includes a steam turbine generator 514, wherein water from the water source 510 is directed adjacent the heat exchanger, wherein the water is converted into steam in response to heat generated by the fuel cell and the steam is directed to the steam turbine generator 514. The system 511 further comprises a condensing unit 518 located a predetermined distance below a ground surface 516, wherein the temperature at the predetermined distance is substantially constant. Once the steam is condensed, it can be taken away from the condensing unit using tube 520. The condensing unit 518 may include a misting system, wherein the misting system aides in the condensing of steam exiting the steam-driven electric generating system. The misting system provides a medium for the steam to interact with and for the molecules to more easily shift in phase from a vapor to a liquid. Power plant 500 according to embodiments of the present invention may include a plurality of steam-driven electricity generating systems.

It will further be understood that at startup, the pumps, and compressors used in the systems of the various embodiments of the present invention may be initially started by an external power source. Once started, the energy generated by the system may be utilized to operate the system. Further the pumps and compressors may be steam operated pumps and compressors. Once the system is operating, a small portion of the steam created may be utilized to operate the pumps and compressors.

Another particular embodiment of the present invention may include a method of using a steam-driven electricity generating system, according to embodiments of the present invention. The method may include steps of receiving water from a water source; heating said water using a heat exchanger comprising a molten carbonate fuel cell as a heat source; and generating electricity using a turbine generator, wherein water from the water source is heated to steam by the heat exchanger and flowed through the turbine generator to rotate a turbine of the turbine generator, wherein electricity is generated in response to rotation of a turbine.

The method may further include steps of pumping water through molten carbonate fuel cell in the heat exchanger; heating water to steam in heat exchanger; and dividing water at the molecular level by use of one of an oxygen generator and electrolysis unit, thereby releasing the hydrogen and oxygen molecules to be preferably collected and stored. The gasses are then preferably introduced into molten carbonate fuel cell. Useful thermodynamic energy is produced in the form of heat as a byproduct from the process whereby hydrogen and oxygen recombine to form water. Dissipated thermodynamic energy given off of molten carbonate fuel cell may become the primary heat source. Water received in a previous step may then be circulated in and/or around molten carbonate fuel cell within the heat exchanger to convert the water into steam.

The method may further comprise the steps of directing the steam to the turbine generator. After generating electricity the method may include steps of collecting steam under low pressure; condensing steam under low pressure to form distilled water; directing the distilled water to one of a distilled water output, a distilled water supply line and combinations thereof. Further, the method may include returning water from the molten carbonate fuel cell to one of the oxygen generator and electrolysis unit.

Further, the method may optionally comprise steps of directing electricity created by the molten carbonate fuel cell to an inverter; inverting the electricity type from DC to AC electricity and adding the AC electricity to electricity generated by the turbine generator. The method may also include producing a by-product of distilled water from any water source type, wherein the water source type is one of a water tank, a fresh water source, a reclaimed water source, a salt water source and combinations thereof.

It should be noted that the steps described in the method of use can be carried out in many different orders according to user preference. Upon reading this specification, those with ordinary skill in the art will now appreciate that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, providing additional equipment within the system, etc., may suffice.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A steam-driven electricity generating system comprising:
   a salt water portion for producing desalinated water from a salt water source, the salt water portion comprising;
      a boiler, a high pressure turbine generator and a low pressure steam turbine generator, wherein the salt water portion produces electricity in response to the desalinization process; and
   a fresh water portion in fluid communication with the salt water portion, the fresh water portion comprising:
      a water source;
      a hydrogen storage tank;
      an electrolysis unit for dividing water at the molecule level releasing hydrogen and oxygen, wherein the hydrogen storage tank stores hydrogen molecules released from the electrolysis unit;
      a heat exchanger, the heat exchanger having a fuel cell with an electrolyte, wherein the fuel cell produces heat and direct current electricity in response to combining hydrogen from the hydrogen storage tank with the electrolyte; and
      a steam turbine generator, wherein water from the water source is directed adjacent the heat exchanger, the water is converted into steam in response to heat generated by the fuel cell and the steam is directed to the steam turbine generator to produce alternating current electricity.

2. The system of claim 1, wherein the steam turbine generator of the fresh water portion produces energy in response to steam produced from the heat exchanger passing through the steam turbine generator.

3. The system of claim 2, further comprising a condenser coupled between the salt water portion and the fresh water portion.

4. The system of claim 3, wherein the boiler converts salt water into steam and brine in response to steam passing through the boiler from the fresh water portion.

5. The system of claim 4, wherein the high pressure steam turbine generator of the salt water portion produces energy in response to high pressure steam passing through the generator, and the low pressure steam turbine generator of the salt water portion produces energy in response to lower pressure steam passing from the high pressure steam turbine generator to the low pressure steam turbine generator.

6. The system of claim 5, wherein the water leaving the condenser is potable water.

* * * * *